(12) United States Patent
Salter et al.

(10) Patent No.: US 12,081,008 B2
(45) Date of Patent: Sep. 3, 2024

(54) VEHICLE TERMINAL HOLDER ASSEMBLY

(71) Applicant: Ford Global Technologies, LLC, Dearborn, MI (US)

(72) Inventors: Stuart C. Salter, White Lake, MI (US); David Brian Glickman, Southfield, MI (US); Zeljko Deljevic, Plymouth, MI (US); Michael John Huddy, Wyandotte, MI (US); Karen A. Stanhope, Dearborn, MI (US); Robert Vitali, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 704 days.

(21) Appl. No.: 17/221,038

(22) Filed: Apr. 2, 2021

(65) Prior Publication Data

US 2022/0320845 A1 Oct. 6, 2022

(51) Int. Cl.
*H02G 3/22* (2006.01)
*B60R 13/00* (2006.01)
*B60R 16/02* (2006.01)
*B60R 16/033* (2006.01)
*H02G 3/32* (2006.01)

(52) U.S. Cl.
CPC ............ *H02G 3/22* (2013.01); *B60R 13/005* (2013.01); *B60R 16/0215* (2013.01); *B60R 16/033* (2013.01); *H02G 3/32* (2013.01)

(58) Field of Classification Search
CPC .......... H02G 3/22; H02G 3/32; B60R 13/005; B60R 16/0215; B60R 16/033; B60L 53/16
See application file for complete search history.

(56) References Cited

U.S. PATENT DOCUMENTS

| | | | |
|---|---|---|---|
| 4,410,226 A | 10/1983 | Adduci et al. | |
| 4,700,961 A | 10/1987 | Thomas et al. | |
| 9,431,807 B2 | 8/2016 | Akahori et al. | |
| 9,592,778 B2 | 3/2017 | Tashiro et al. | |
| 10,688,946 B1* | 6/2020 | Bove | B60K 35/10 |
| 10,870,453 B2* | 12/2020 | Elder | B60R 9/052 |

* cited by examiner

*Primary Examiner* — Michael C Zarroli
(74) *Attorney, Agent, or Firm* — Vichit Chea; Carlson, Gaskey & Olds, P.C.

(57) ABSTRACT

A vehicle terminal holder assembly according to an exemplary aspect of the present disclosure includes, among other things, an electronic latch configured to hold a closure assembly in a latched position, and a vehicle body structure. The terminal holder assembly further includes a terminal holder that can be accessed through an aperture in the vehicle body structure and moved to a disengaged position relative to the vehicle body structure through the aperture. At least one terminal is held by the terminal holder. The at least one terminal is operatively coupled to the electronic latch when the terminal holder is in the disengaged position.

20 Claims, 4 Drawing Sheets

VEHICLE TERMINAL HOLDER ASSEMBLY

TECHNICAL FIELD

This disclosure relates generally to a holder for vehicle electrical connectors and, more particularly, to a holder holding terminals that can be used to transition an electronic latch of the vehicle.

BACKGROUND

Vehicles can include closure assemblies such as side doors, trunk lids, and frunk lids. An electronic latch can be used to hold a closure assembly in a closed position. A battery of the vehicle typically powers the electronic latch. A power source outside the vehicle can sometimes be used to power the electronic latch. The power source outside the vehicle can be electrically coupled to the electronic latch through terminals. Some vehicles provide access to these terminals through an opening in a fascia of the vehicle.

SUMMARY

A vehicle terminal holder assembly according to an exemplary aspect of the present disclosure includes, among other things, an electronic latch configured to hold a closure assembly in a latched position, and a vehicle body structure. The terminal holder assembly further includes a terminal holder that can be accessed through an aperture in the vehicle body structure and moved to a disengaged position relative to the vehicle body structure through the aperture. At least one terminal is held by the terminal holder. The at least one terminal is operatively coupled to the electronic latch when the terminal holder is in the disengaged position.

In another example of the foregoing assembly, the closure assembly is a frunk lid.

Another example of any of the foregoing assemblies includes an accessory battery held within a frunk covered by the frunk lid in a closed position. The accessory battery is operatively coupled to the electronic latch.

In another example of any of the foregoing assemblies, the vehicle body structure is a fascia of the vehicle.

In another example of any of the foregoing assemblies, the fascia is a front fascia of the vehicle.

In another example of any of the foregoing assemblies, the fascia provides an entire circumferential perimeter of the aperture.

Another example of any of the foregoing assemblies includes a bezel of the vehicle body structure. The terminal holder is configured to engage the bezel of the vehicle body structure.

In another example of any of the foregoing assemblies, the bezel is sonically welded to a B-side of a fascia.

In another example of any of the foregoing assemblies, the terminal holder snap-fits to the bezel when the terminal holder engages the vehicle body structure.

Another example of any of the foregoing assemblies includes a cover configured to conceal the terminal holder.

In another example of any of the foregoing assemblies, the at least one terminal includes a first terminal and a second terminal. The assembly further includes a first wire operably connected to the first terminal and a second wire operably connected to the second terminal.

In another example of any of the foregoing assemblies, the terminal holder includes a first rib and a second rib. The first rib holds the first wire and the second rib holds the second wire.

Another example of any of the foregoing assemblies includes a bezel of the vehicle body structure. The terminal holder is slidably received within a bezel such that the at least one terminal is aft all portions of the bezel when the terminal holder is in the installed position.

In another example of any of the foregoing assemblies, the terminal holder is configured to clip to the bezel.

A vehicle terminal holder assembly according to another exemplary aspect of the present disclosure includes, among other things, a closure assembly, an electronic latch configured to hold the closure assembly in a latched position, a fascia, a bezel secured to the fascia, a terminal holder configured to snap-fit to the bezel, and at least one terminal held by the terminal holder. The at least one terminal is operatively coupled to the electronic latch.

Another example of any of the foregoing assemblies includes at least one clip that engages the fascia with the bezel.

In another example of any of the foregoing assemblies, the at least one clip extends from the terminal holder through an aperture in the bezel when the terminal holder engages the bezel.

In another example of any of the foregoing assemblies, the closure assembly is a frunk lid.

Another example of any of the foregoing assemblies includes an accessory battery held within a frunk of the vehicle. The accessory battery is operatively coupled to the E-latch.

A vehicle E-latch actuation method includes, among other things, transitioning a terminal holder from an engaged position relative to a vehicle body structure to a disengaged position relative to the vehicle body structure, holding first and second terminals with the terminal holder when the terminal holder is in the engaged position and when the terminal holder is in the disengaged position; and powering an E-latch using the first and second terminals when the terminal holder is in the disengaged position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
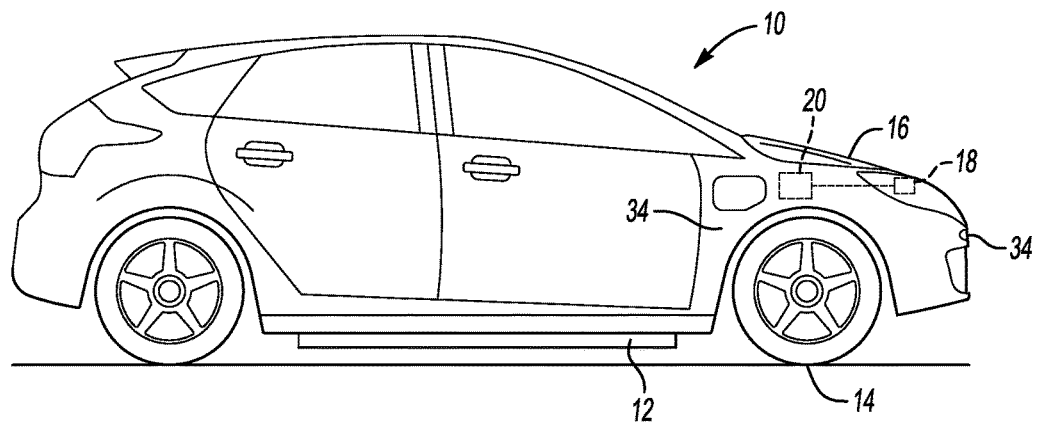
FIG. 1 illustrates a side view of an electrified vehicle having an electronic latch and associated terminals according to an exemplary aspect of the present disclosure.
Figure 2:
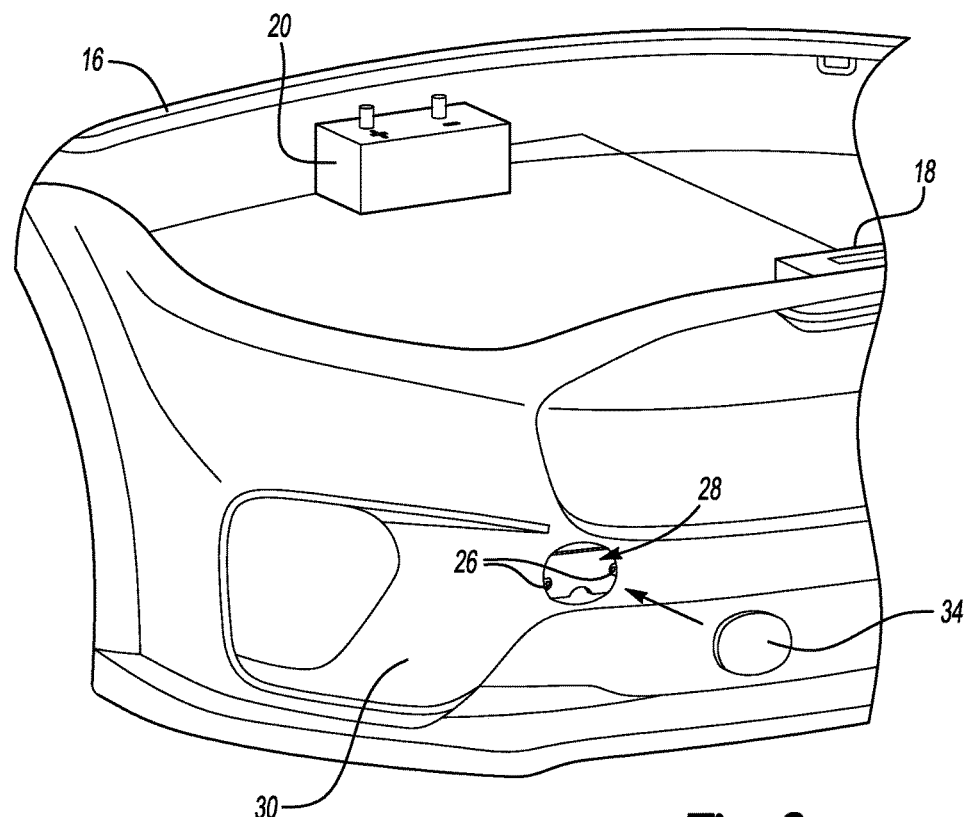
FIG. 2 shows a close-up perspective view of a passenger side front corner area of the electrified vehicle of FIG. 1.
Figure 3:
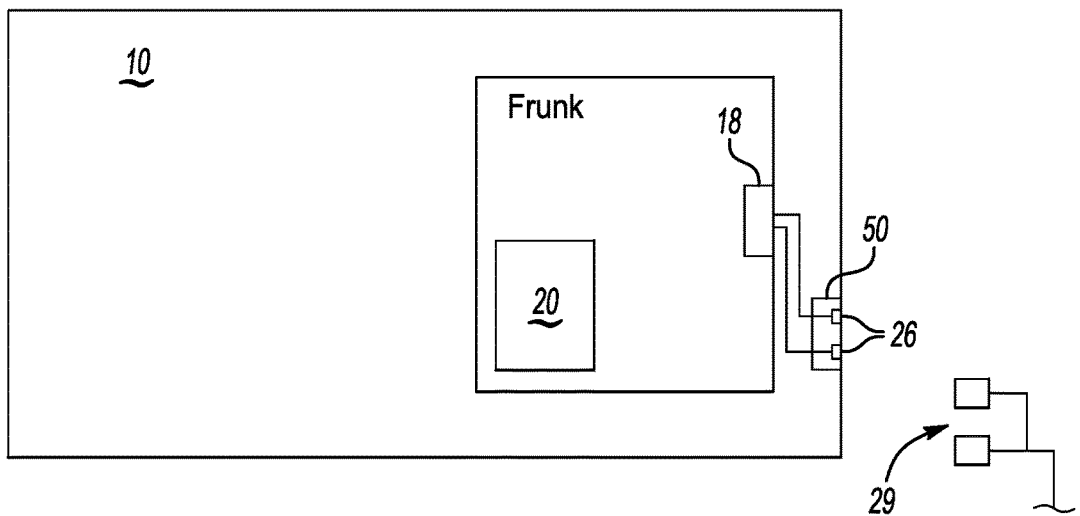
FIG. 3 illustrates a schematic view of a terminal holder assembly that holds the terminals associated with the electronic latch of FIGS. 1 and 2.
Figure 4:
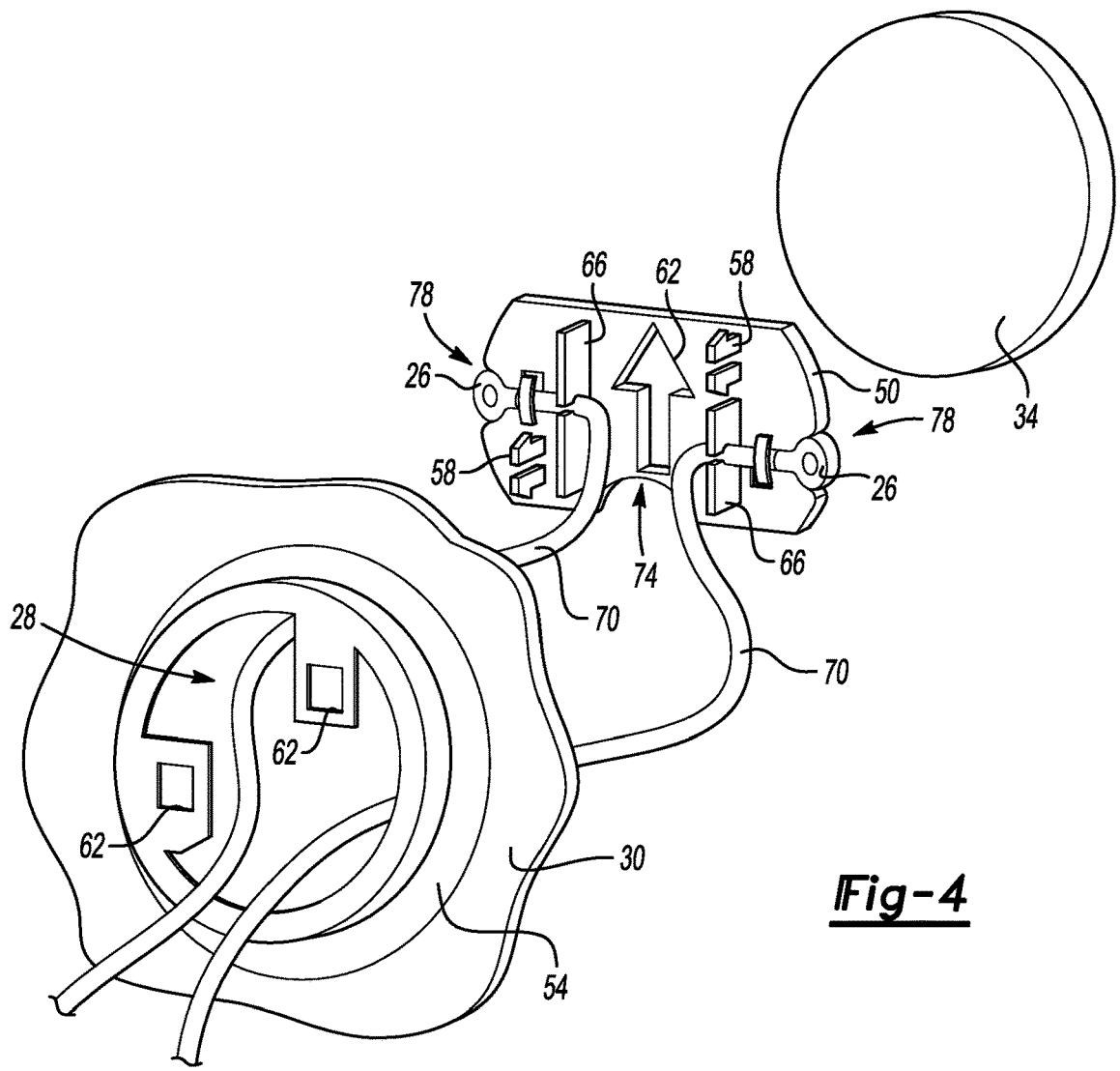
FIG. 4 illustrates an expanded view of the vehicle terminal holder assembly of FIG. 2.

This disclosure relates generally to a vehicle terminal holder assembly. In particular, the disclosure is directed toward a terminal holder that that can hold terminals associated with an electronic latch of an electrified vehicle. The terminals can be utilized when powering the electronic latch from a power source external to the vehicle, which may be necessary if a vehicle battery is not able to power the electronic latch. The terminal holder assembly can hold the terminals securely and spaced apart from one another during the powering, which can help to avoid short circuits.

With reference to FIGS. 1-4, an exemplary electrified vehicle 10 is a battery electric vehicle (BEV) that includes a traction battery 12. The vehicle 10 can have a powertrain incorporating a drive system that rotates drive wheels 14 utilizing torque from an electric machine that is powered by the traction battery. The exemplary vehicle 10 is an all-electric vehicle, however, other types of vehicles fall within the scope of this disclosure, including conventional vehicles that rely on an internal combustion engine to provide drive power, and hybrid vehicles that can rely on an electric machine, an internal combustion engine, or both.

The vehicle 10 includes a closure assembly 16 an electronic latch (E-latch) 18. The closure assembly 16 is a frunk lid in this example. In the closed position, the closure assembly 16 covers a frunk, which is in a forward area of the vehicle 10. When the E-latch 18 is in a latched position, the E-latch holds the closure assembly 16 in the closed position.

In a conventional vehicle, the forward area is typically used to house an engine. Since the vehicle 10 is an all-electric vehicle, the front area is available for use as a frunk.

The exemplary vehicle 10 uses the frunk to hold an accessory battery 20, which is a 12-Volt battery in this example. The accessory battery 20 is a relatively low voltage battery when compared to the traction battery 12. The accessory battery 20 can be used to power various loads on the vehicle 10. In this example, the E-latch 18 is powered by the accessory battery 20.

The accessory battery 20 may lose charge such that the accessory battery 20 is not able to adequately power the E-latch 18. Powering the E-latch 18 from another power source may then be required to transition the E-latch 18 so that the closure assembly 16 can be opened. To power to the E-latch 18 from the other power source, the vehicle 10 includes terminals 26 that are accessible through an aperture 28 of the vehicle 10. The terminals 26 can be accessed when the closure assembly 16 is closed.

The terminals 26 are electrically coupled directly to the E-latch 18. When the vehicle closure assembly 16 is closed, the user can connect jumper cables 29 to the terminals 26 so that the E-latch 18 can be actuated to release the closure assembly 16. The accessory battery 20 can then be accessed for recharging or repair.

The aperture 28 is within a fascia 30 of the vehicle 10 and, more specifically, a front fascia. The fascia 30 provides an entire circumferential perimeter of the aperture 28. In other examples, the aperture 28 is partially or completely provided by other vehicle body structures, such as a front fender 32 of the vehicle 10.

The aperture 28 is covered by a cap 34 when access to the terminals 26 is not required.

The present disclosure describes methods for securing and retaining the terminals 26. In the exemplary embodiment, the terminals 26 are held by a terminal holder 50 that engages the fascia 30, and particularly a bezel 54 of the fascia 30. The terminal holder 50 can be accessed through the aperture 28 after removing the cap 34. The terminal holder 50, in the exemplary embodiment, is disengaged from the bezel 54 when access to the terminals 26 is required. While the terminal holder 50 is holding the terminals 26 and the terminal holder 50 is disengaged from the bezel 54, the jumper cables 29 can be connected to the terminals 26. The terminal holder 50 helps the terminals 26 separated when the jumper cables 29 are connected.

The bezel 54, in the exemplary embodiment, is annular. The bezel 54 is sonically welded to a B-side of the fascia 30 in this example.

The terminal holder 50 can be a molded polymer or polymer-based material. In this example, the terminal holder 50 includes snap features 58, here arrow-head clips, that snap into respective apertures 62 of the bezel 54. The snap features 58 are two-way carets in this example. The snap features 58 are offset to provide an error-proofing alignment feature.

The terminal holder 50 further includes an arrow feature 62 and ribs 66. The arrow feature 62 can be used to visually indicate to an assembler a proper orientation of the terminal holder 50. The arrow feature 62 can be molded into the terminal holder 50. The ribs 66 are disposed on a backside of the terminal holder 50. Wires 70 extending from the respective terminals 26 to the E-latch 18 are clipped into the ribs 66 to relieve tension on the wires 70. The ribs 66 also provide a physical barrier between the terminals 26 to lessen a likelihood of any electrical short.

The example terminal holder 50 is formed to include a finger pull area 74. When the terminal holder 50 is engaged with the bezel 54, the terminal holder 50 can be disengaged by pulling the finger pull area 74.

The terminal holder 50 is formed to include a terminal clearance area 78 associated with each of the terminals 26. The terminal clearance areas 78 provide clearance for securing jumper cables to the terminals 26. Notably, when the jumper cables are electrically connected to the terminals 26, the terminals 26 are still help by the terminal holder 50. This can also help to lessen the likelihood of an electrical short.

Figure 5:
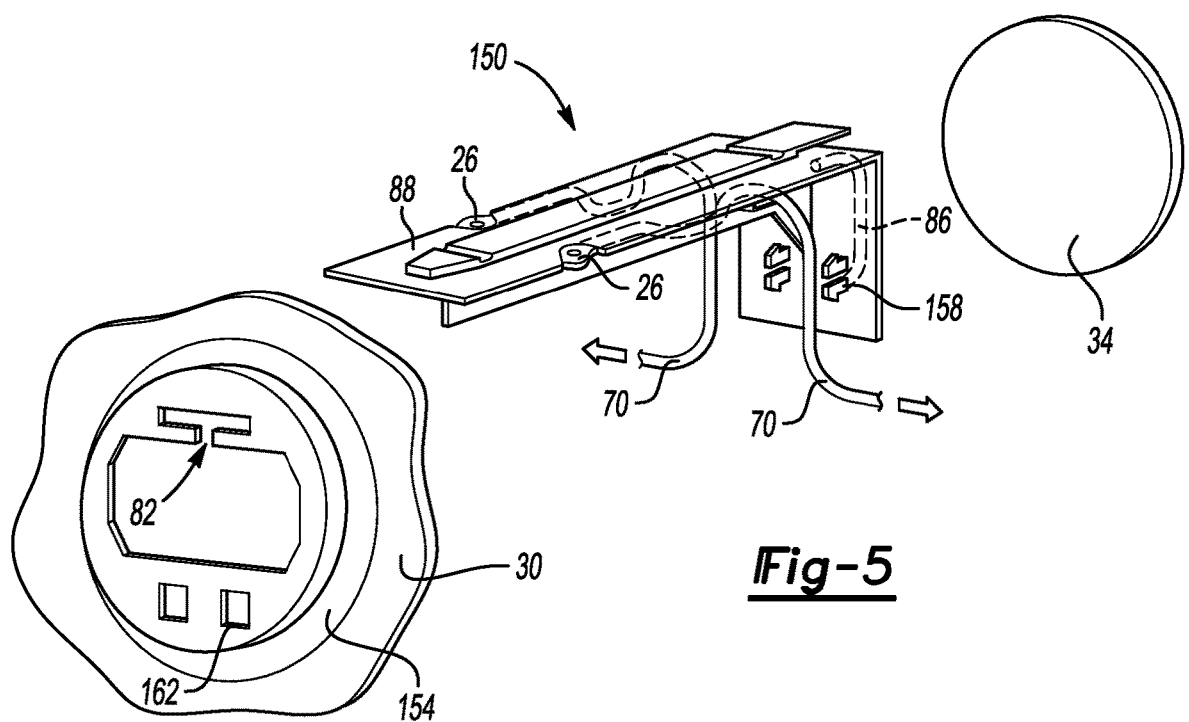
FIG. 5 illustrates a vehicle terminal holder assembly according to another exemplary embodiment of the present disclosure.

With reference now to FIG. 5, a terminal holder 150, according to another exemplary aspect of the present disclosure, includes snap-in features 158. When the terminal holder 150 is in the installed position, the snap-in features can engage respective apertures 162 within a bezel 154 of the fascia 30. The terminal holder 150 slide through an opening 82, here a slot, of the bezel 154 when moving to the installed position.

The terminal holder 150 keeps the terminals 26 spaced further rearward from the fascia 30 when in the installed position than the terminal holder 50. This can help to keep the terminals 26 of the terminal holder 150 further from loads contacting the fascia 30 that the terminals 26 of the terminal holder 50. In this example, the terminals 26 are aft all portions of the bezel 154 when the terminal holder 50 is in the installed position. Aft is with reference to a general orientation of the vehicle during operation. The aft positioning can help to meet pedestrian protection guidelines.

The terminal holder 150 includes a finger pull 86 that can fold flat against the forward most surface of the terminal holder 150 when not required. This can also provide clearance for the cap 34 to move to an engaged position covering the terminal holder 150.

When moving the terminal holder 150 to the installed position, a divot 88 in the terminal holder 150 can act as a stop as the terminal holder 150 slides through the opening 82. The divot 88 can help to prevent the terminal holder 150 from simply falling out of the bezel 154 when the terminal holder 150 is withdrawn from the installed position.

Figure 6:
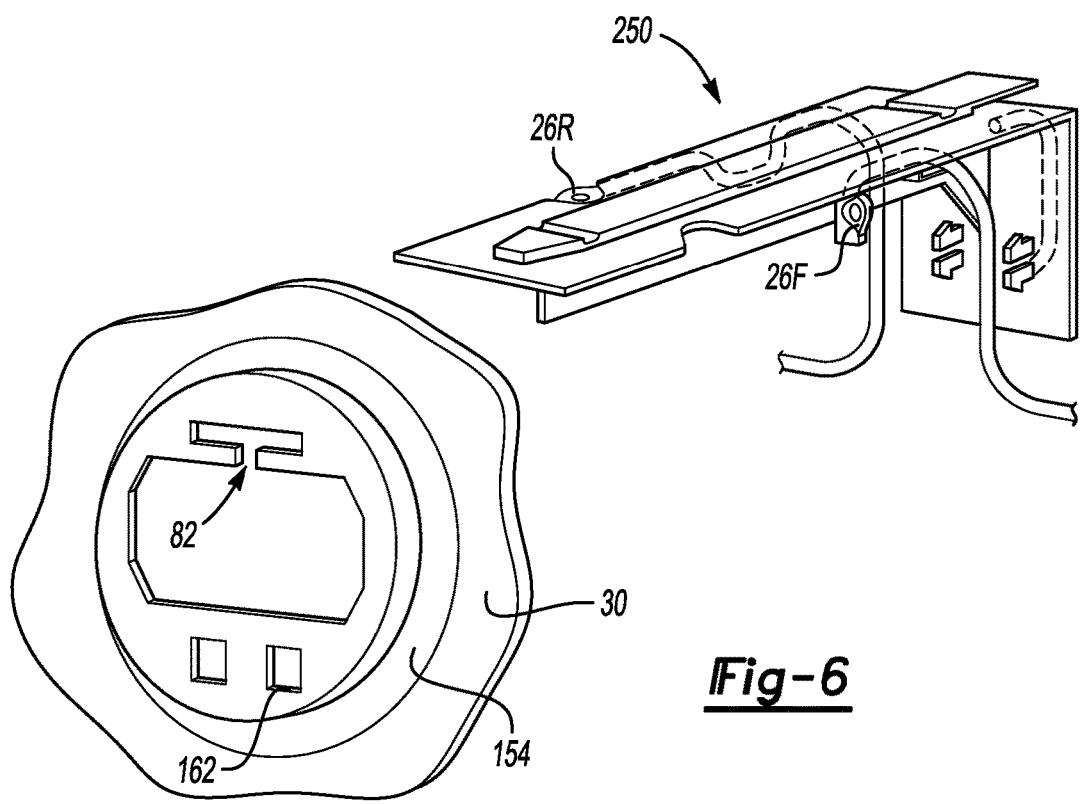
FIG. 6 illustrates a vehicle terminal holder assembly according to yet another exemplary embodiment.

With reference now to FIG. 6, a terminal holder 250, according to another exemplary aspect of the present disclosure, is very similar to the embodiment shown in FIG. 5. The terminal holder 250, however, holds one of the terminals 26F forward the other terminal 26R. The terminal holder 250 also holds the terminal 26F such that the terminal 26F is oriented along a vertical plane and the terminal 26R is oriented along a horizontal plane. Holding the terminals 26F and 26R further from each other and at differing planar orientations can, in some examples, help to guard against electrical short circuits.

Figure 7:
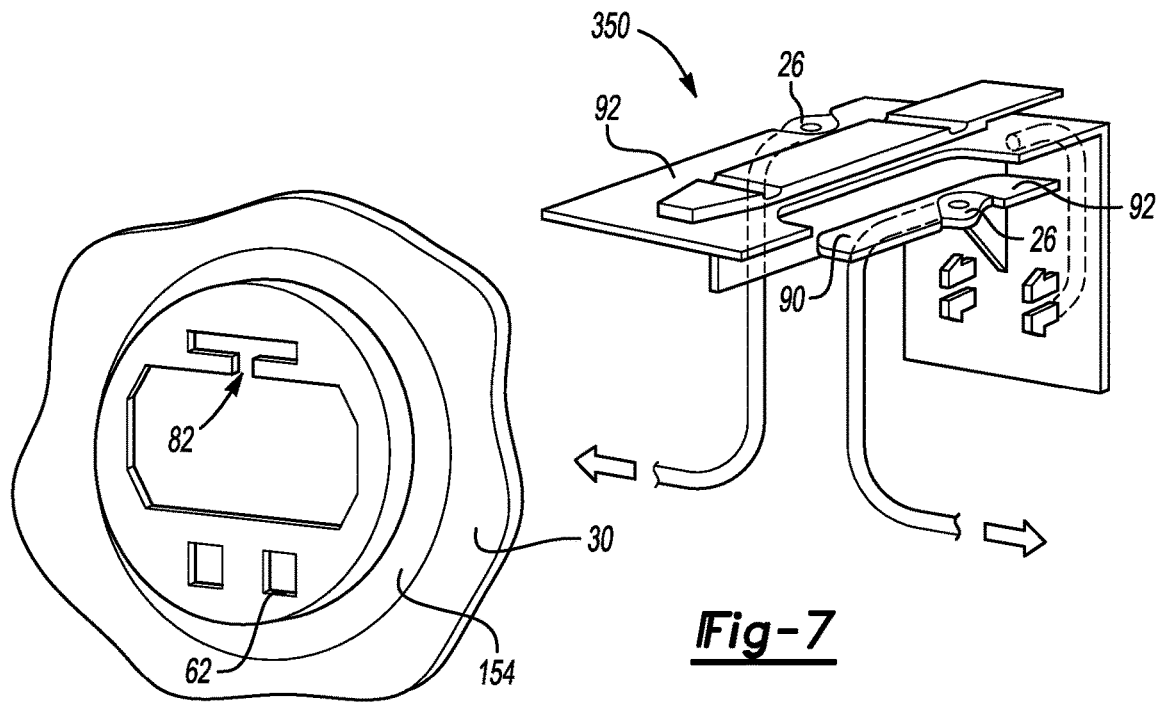
FIG. 7 illustrates a vehicle terminal holder assembly according to yet another exemplary embodiment.

With reference now to FIG. 7, a terminal holder 350, according to yet another exemplary embodiment, holds terminals 26 within cutouts 90 of ribs 92. The cutouts 90 can facilitate aligning jumper cables of various sizes while protecting jumper cables.

Figure 8:
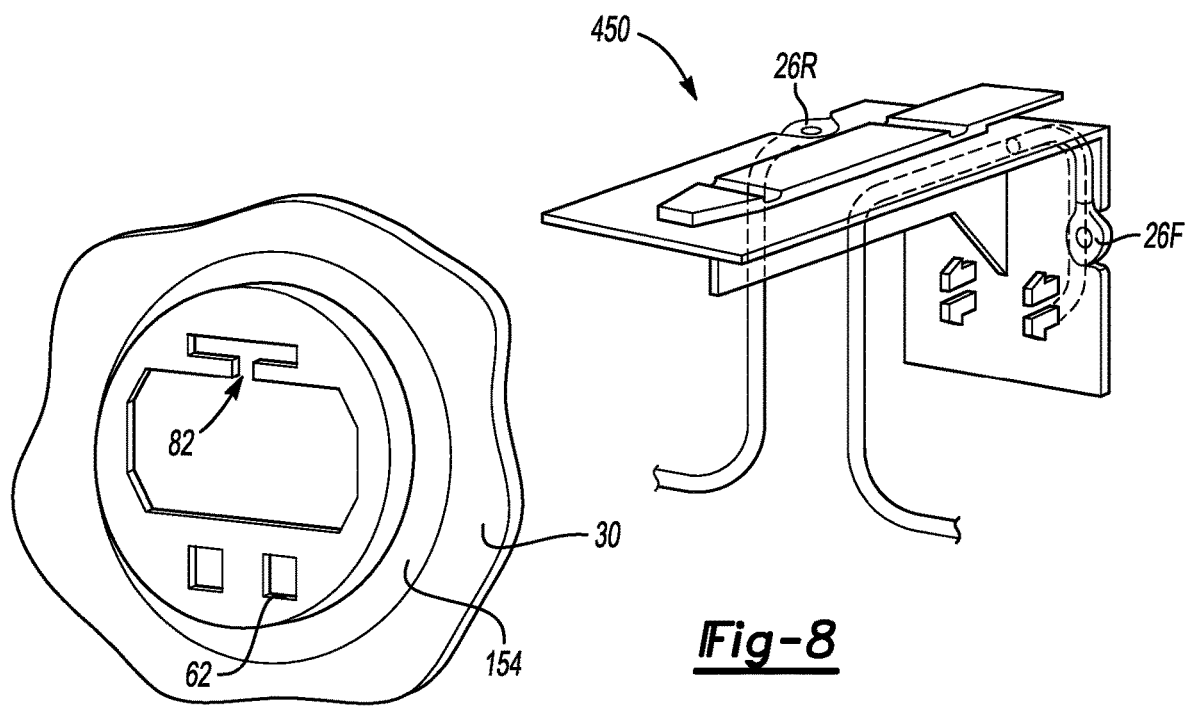
FIG. 8 illustrates a vehicle terminal holder assembly according to still another exemplary embodiment.

Referring now to FIG. 8, a terminal holder 450, according to yet another exemplary embodiment, is similar to the cutout embodiment of FIG. 7, but holds the terminal 26F forward the terminal 26R. The terminal holder 250 also holds the terminal 26F such that the terminal 26F is oriented along a vertical plane and the terminal 26R is oriented along a horizontal plane.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle terminal holder assembly, comprising:
   an electronic latch configured to hold a closure assembly in a latched position;
   a vehicle body structure;
   a terminal holder configured to be accessed through an aperture in the vehicle body structure and moved to a disengaged position relative to the vehicle body structure through the aperture; and
   at least one terminal held by the terminal holder, the at least one terminal operatively coupled to the electronic latch when the terminal holder is in the disengaged position.

2. The vehicle terminal holder assembly of claim 1, wherein the closure assembly is a frunk lid.

3. The vehicle terminal holder assembly of claim 2, further comprising an accessory battery held within a frunk covered by the frunk lid in a closed position, the accessory battery operatively coupled to the electronic latch.

4. The vehicle terminal holder assembly of claim 1, wherein the vehicle body structure is a fascia of the vehicle.

5. The vehicle terminal holder assembly of claim 4, wherein the fascia is a front fascia of the vehicle.

6. The vehicle terminal holder assembly of claim 4, wherein the fascia provides an entire circumferential perimeter of the aperture.

7. The vehicle terminal holder assembly of claim 1, further comprising a bezel of the vehicle body structure, the terminal holder configured to engage the bezel of the vehicle body structure.

8. The vehicle terminal holder assembly of claim 7, wherein the bezel is sonically welded to a B-side of a fascia.

9. The vehicle terminal holder assembly of claim 7, wherein the terminal holder snap-fits to the bezel when the terminal holder engages the vehicle body structure.

10. The vehicle terminal holder assembly of claim 1, further comprising a cover configured to conceal the terminal holder.

11. The vehicle terminal holder assembly of claim 1, wherein the at least one terminal includes a first terminal and a second terminal, and further comprising a first wire operably connected to the first terminal and a second wire operably connected to the second terminal.

12. The vehicle terminal holder assembly of claim 11, wherein the terminal holder includes a first rib and a second rib, wherein the first rib holds the first wire and the second rib holds the second wire.

13. The vehicle terminal holder assembly of claim 1, further comprising a bezel of the vehicle body structure, wherein the terminal holder is slidably received within a bezel such that the at least one terminal is aft all portions of the bezel when the terminal holder is in the installed position.

14. The vehicle terminal holder assembly of claim 13, wherein the terminal holder is configured to clip to the bezel.

15. A vehicle terminal holder assembly, comprising:
    a closure assembly;
    an electronic latch configured to hold the closure assembly in a latched position;
    a fascia;
    a bezel secured to the fascia;
    a terminal holder configured to snap-fit to the bezel, the terminal holder disposed within an aperture of the fascia when the terminal holder is snap-fit to the bezel;
    at least one terminal held by the terminal holder, the terminal operatively coupled to the electronic latch; and
    a cap configured to cover the terminal holder when the terminal holder is snap-fit to the bezel.

16. The vehicle terminal holder assembly of claim 15, further comprising at least one clip that engages the terminal holder with the bezel.

17. The vehicle terminal holder assembly of claim 16, wherein the at least one clip extends from the terminal holder through an aperture in the bezel when the terminal holder engages the bezel.

18. The vehicle terminal holder assembly of claim 17, wherein the closure assembly is a frunk lid.

19. The vehicle terminal holder assembly of claim 18, further comprising an accessory battery held within a frunk of the vehicle, the accessory battery operatively coupled to the E-latch.

20. A vehicle E-latch actuation method, comprising;
    accessing a terminal holder through an aperture in vehicle body structure;
    transitioning, during the accessing, the a-terminal holder from an engaged position relative to the vehicle body structure to a disengaged position relative to the vehicle body structure;
    holding first and second terminals with the terminal holder when the terminal holder is in the engaged position and when the terminal holder is in the disengaged position; and
    powering an E-latch using the first and second terminals when the terminal holder is in the disengaged position.

* * * * *